United States Patent
Boloorian

(10) Patent No.: US 7,254,161 B2
(45) Date of Patent: Aug. 7, 2007

(54) METHOD FOR FREQUENCY OFFSET ESTIMATION IN A DIRECT SEQUENCE SPREAD SPECTRUM COMMUNICATIONS RECEIVER

(75) Inventor: Majid Boloorian, Kirkland, WA (US)

(73) Assignee: NEC Corporation (JP)

( * ) Notice: Subject to any disclaimer, the term of this patent is extended or adjusted under 35 U.S.C. 154(b) by 720 days.

(21) Appl. No.: 10/204,217

(22) PCT Filed: Feb. 19, 2001

(86) PCT No.: PCT/JP01/01157

§ 371 (c)(1),
(2), (4) Date: Nov. 18, 2002

(87) PCT Pub. No.: WO01/61880

PCT Pub. Date: Aug. 23, 2001

(65) Prior Publication Data

US 2003/0142733 A1 Jul. 31, 2003

(30) Foreign Application Priority Data

Feb. 19, 2000 (GB) ................................ 0003859.6

(51) Int. Cl.
H04B 1/69 (2006.01)
H04B 1/707 (2006.01)
H04B 1/713 (2006.01)

(52) U.S. Cl. ...................... 375/149; 375/148; 375/150; 375/326; 375/344

(58) Field of Classification Search ................ 375/148, 375/149, 150, 144, 145, 326, 344, 140
See application file for complete search history.

(56) References Cited

U.S. PATENT DOCUMENTS 6,005,889 A * 12/1999 Chung et al. ................ 375/140
6,266,361 B1 * 7/2001 Huang et al. ............... 375/140

FOREIGN PATENT DOCUMENTS

| JP | 6-77932 A | 3/1994 |
| JP | 8-18548 A | 1/1996 |
| JP | 2001-102960 | 4/2001 |
| JP | 2001-102961 | 4/2001 |
| JP | 2001-177436 | 6/2001 |
| WO | WO-99/12273 A1 | 3/1999 |
| WO | WO-99/31816 A1 | 6/1999 |
| WO | WO 99/66649 | 12/1999 |

* cited by examiner

Primary Examiner—Phuong Phu
(74) Attorney, Agent, or Firm—Dickstein, Shapiro, LLP.

(57) ABSTRACT

A method of estimating the difference in frequency between base station transmissions received over a radio channel and a locally generated carrier frequency in a mobile receiver. The differential phase shifts imparted to different parts of a received synchronization code because of a frequency offset of the local reference oscillator are detected in the receiver. A series of partial correlations of the received synchronization code over a single transmission slot allows detection of the differential phase shifts. Signal to noise ratios may be improved by means of a series of overlapping partial correlations. The period over which the correlations are performed is much less than the coherence time of the radio channel.

3 Claims, 4 Drawing Sheets

METHOD FOR FREQUENCY OFFSET ESTIMATION IN A DIRECT SEQUENCE SPREAD SPECTRUM COMMUNICATIONS RECEIVER

TECHNICAL FIELD

This invention relates to direct sequence spread spectrum communications and in particular it relates to a method for estimating the frequency offset of a local signal in a mobile receiver.

BACKGROUND ART

In cellular systems the timing and frequency accuracy of transmissions from network base stations rely on very stable and highly accurate reference oscillators. In the competitive market for supply of mobile stations for communication with the network base stations a low cost is demanded by the prospective purchasers of mobile equipment. Therefore low cost reference oscillators e.g voltage controlled crystal oscillators (VCXO) would be the usual choice for the reference oscillator of a mobile station such as is used in a wideband code division multiple access (WCDMA) network.

The frequency accuracy of these low cost reference oscillators e.g. 5 parts per million (ppm), is very much less than the frequency accuracy of the reference oscillators available to the base stations (e.g. 0.05 ppm). The resulting difference in frequency between the base station transmissions and the locally generated carrier frequency used for down-conversion in the mobile station, the so-called frequency offset, causes problems with synchronization. Further frequency errors can arise at the mobile station because of the Doppler shifts produced by the movements of the mobile station.

When power is applied to a mobile station the task of synchronization with a base station is initiated (initial cell search). The characteristics of the Universal Mobile Telecommunications System (UMTS) and the procedure for initial cell search to which the following description relates is described in the European Telecommunications Standards Institute (ETSI) publication TR 101 146 version 3.0.0 Universal Mobile Telecommunications System, Concept evaluation. As will be clear to those skilled in the art the instant invention is not restricted to use with the UMTS and may also be applied to other WCDMA systems. Reference is made to U.S. Pat. No. 5,982,809 to Liu which forms part of the prior art.

The initial cell search by the mobile station is performed in three steps and the first step is the acquisition of slot synchronization to the transmissions of the base station providing, through a fading path, the strongest signal at the receiver of the mobile station. With reference to FIG. 1 which is a schematic illustration of base station broadcast transmissions, base station transmissions are represented at 1, the transmission channel at 2 and the mobile station receiver at 3. In FIG. 1 by way of example the transmissions from only two base stations (BTS1 and BTS2) are shown.

These base station transmissions are not synchronized with each other and are maintained to transmit over common fixed duration time intervals referred to as slots and common fixed duration framing intervals referred to as frames. One frame comprises 15 slots. In FIG. 1 the start of a slot for the transmissions from BTS 2 is shown delayed from the start of a slot for the transmissions from BTS1 by an arbitrary amount t seconds.

The base station transmissions include a synchronization channel (SCH) aligned with the slot boundary and a primary common control physical channel (PCCPCH). The synchronization channel comprises a primary synchronization code (PSC) and a secondary synchronization code (SSC) as illustrated in FIG. 2. The code transmitted as the primary synchronization code (Cp) is repeated at the beginning of each slot by all base stations.

The BTS transmissions to the receiver 3 will be affected by channel 2 and the transmissions of BTS 2 are illustrated as received through a 3-path (multipath) channel while the transmissions of BTS1 are illustrated as received through a 2-path channel. The signals from BTS 1 and BTS2 are effectively summed in channel 2 before arriving at receiver 3. Correlation of the received signal with the expected primary synchronization code which is stored in the receiver provides a number of correlation peaks. The highest peak detected corresponds to that base station of the network (the found base station) to which the receiver will synchronize.

The second step of initial cell search establishes frame synchronization and identifies the code group of the base station found in step 1 (the found base station). The third step of initial cell search determines the scrambling code assigned to the found BS. To avoid prolixity further details regarding the second and third steps of the initial cell search are not presented here and reference is made to ETSI publication TR 101 146 supra.

It is an object of this invention to provide an improved method of estimating the frequency offset in a direct sequence spread spectrum communications receiver.

In accordance with the invention there is provided a method of estimating the frequency offset in a direct sequence spread spectrum communications receiver comprising computation of differences in phase imparted by down-conversion in the receiver to parts of a synchronization code received over a radio channel, said differences in phase being computed from a series of correlations of parts of the received synchronization code with a synchronization code stored in the receiver, in which the period over which the series of correlations is performed is not greater than the length of said stored synchronization code.

An example of the present invention will now be described with reference to the figures in which.

Figure 1:
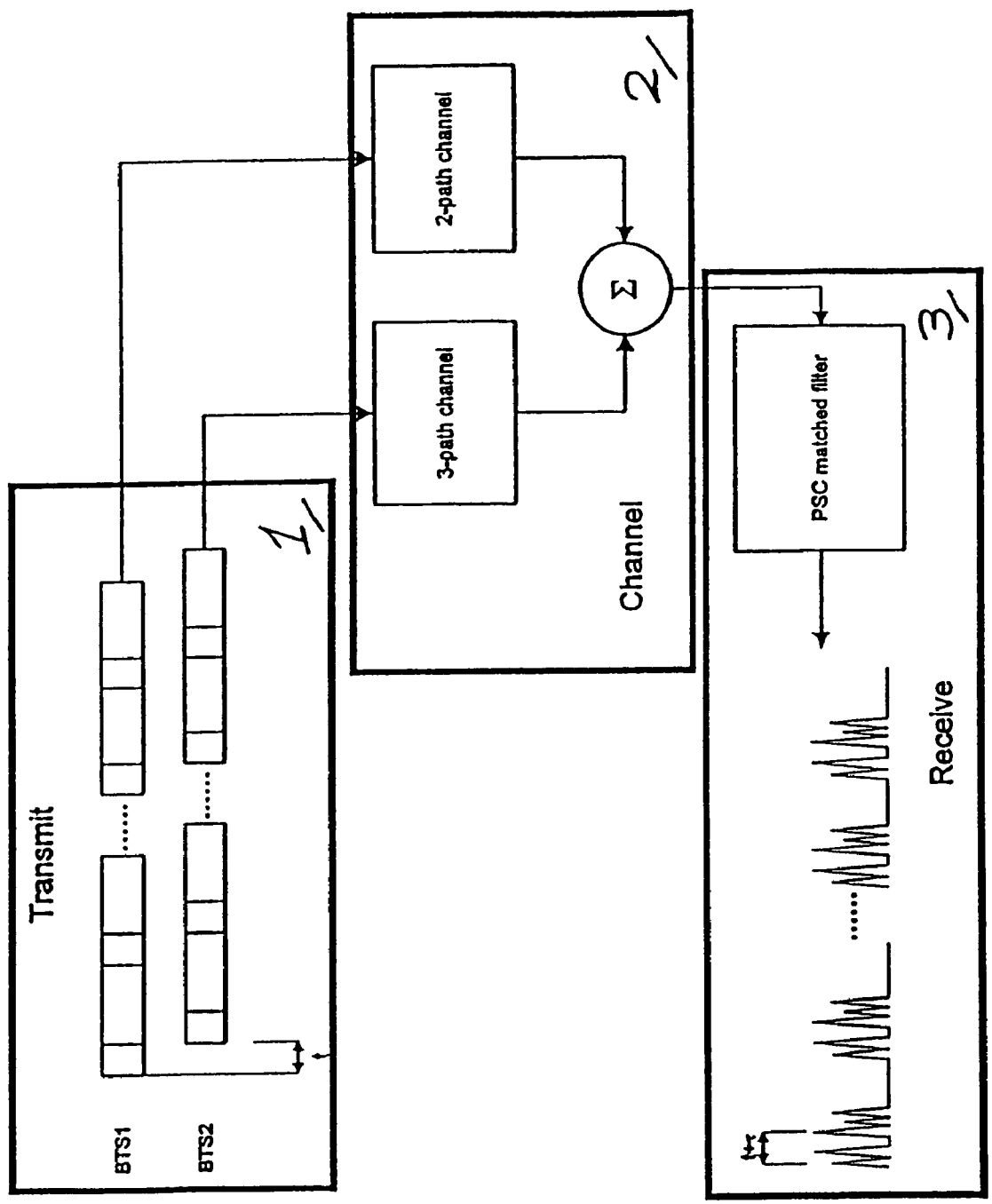
FIG. 1 is a schematic illustration of base station transmissions.
Figure 2:
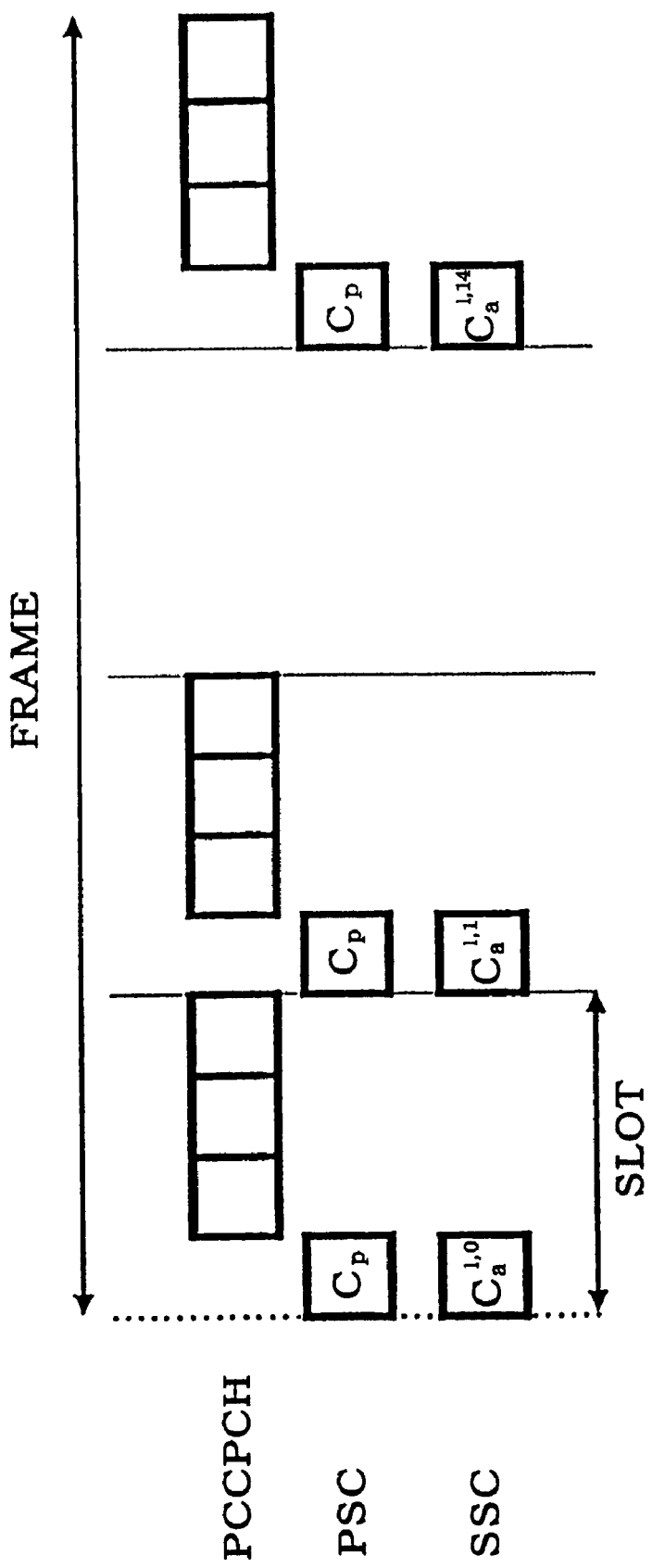
FIG. 2 illustrates the composition of base station transmissions.

The implementation of the invention described herein is applicable to the initial cell search performed at a mobile station operating in the frequency division duplex (FDD) mode in a UMTS network.

The performance of the UMTS cell search can be degraded by offsets in the carrier and sampling clock frequencies. In practice, both the carrier and sampling clock frequencies are derived, from the frequency of a reference oscillator (usually a VCXO). The carrier ($f_c$) and the sampling clock frequencies ($f_{smp}$) may be expressed as in equations (1) and (2) respectively. The terms $k_1$ and $k_2$ in these equations represent constants and $f_x$ is the reference frequency supplied by the reference oscillator of the mobile station.

$$f_c = k_1 \times f_x \qquad (1)$$

$$f_{smp} = k_2 \times f_x \qquad (2)$$

The equations (1) and (2) indicate the ways in which inaccuracies in the reference frequency generated by the crystal oscillator translate into the inaccuracies in the carrier and sampling clock frequencies. When expressed in parts per million, the same inaccuracy will apply to each of the three frequencies, $f_x$, $f_c$ and $f_{smp}$. For example, for a desired carrier frequency of 2 GHz, and a sampling clock frequency of 15.36 MHz, an inaccuracy of 1 ppm (in $f_x$) represents offsets of 2 kHz in the carrier frequency and 15.36 Hz in the sampling frequency.

With regard to WCDMA cell search, the carrier frequency offset results in a continuous phase variation of the received complex signal. The sampling clock frequency offset may cause incorrect detection of vital system timing instances. Any effects of an offset in the sampling clock frequency are observed only after processing of the signals in a large number of slots. The phase rotation caused by the offsets in the carrier frequency results in a decrease in the received ratio of the signal power versus the noise plus interference power and as a consequence, an increase in the probability of instances of false detection of timing. Therefore offsets in both the carrier frequency and the sampling clock frequency will result in a degradation of the performance in all three steps of the UMTS cell search process.

The loss of performance in the cell search caused by the frequency inaccuracies is evident during the first step of the cell search process. Sampling clock offsets may cause errors in detection of the slot boundaries i.e. the slot boundaries will be positioned in the wrong places. If the error in locating the slot boundaries is larger than one chip period, the results obtained by the remaining cell search steps will also be in error. For practical frequency inaccuracies, however, a slippage of 1 chip caused by the sampling clock inaccuracies is observed over long time intervals.

Consequently, the inaccuracies of the sampling clock are of secondary importance when compared to the offsets in the carrier frequency. As the effects of an offset in the carrier frequency are observable immediately, these effects can be measured and used to correct the reference frequency. A reduction in the inaccuracy of the reference frequency will reduce the offsets in both the carrier and sampling clock frequencies also. The method described herein is based on the differential phase offsets imparted to the received primary synchronization code at down-conversion by errors in the local oscillator frequency used for down-conversion. The resulting measurements of phase offset are used to correct the reference oscillator frequency.

A complex baseband signal transmitted by a base station may be represented as $$S_t = A(t) \cdot e^{j\theta(t)},$$

where A(t) and θ(t) represent the magnitude and phase respectively of the signal. The transmitted signal when received via a fading path can be represented as:

$$S_r = \beta(t) \cdot S_t e^{j(\Delta\omega t + \phi(t) + \sigma(t))} \qquad (3)$$

where Δω is the carrier frequency offset in radians per second, φ(t) is the random phase (in radians) due to the Doppler shift and σ(t) is the random phase due to noise and interference. Variations of the signal envelope are represented as β(t).

In the first step of the UMTS cell search, the in phase (I) and quadrature (Q) components of the received signal are correlated with the primary synchronization code. When the local primary synchronization code is aligned with the first symbol of a received PCCPCH+SCH time-slot (i.e. at the slot boundary), the transmit signal may be expressed as:

$$S_t = M \cdot e^{j\frac{\pi}{4}} \qquad (4)$$

where M is a constant. The correlation of the corresponding received signal with the local primary synchronization code stored in the receiver is shown in equation (5), where T is the correlation period.

$$C = \int_0^T \left[ \beta(t) \cdot M^2 \cdot e^{j\frac{\pi}{4}} \cdot e^{j(\Delta\omega t + \phi(t) + \sigma(t))} \right] \cdot dt \qquad (5)$$

Equation (5) represents the correlation between the local primary synchronization code and the received signal at the slot boundaries. As the primary synchronization code is a known signal, the carrier frequency offset may be estimated by measuring the change in the phase of the received primary synchronization code. The effect of the signal components due to Doppler and noise plus interference are discussed below and for clarity are removed from equation 5 which may then be reduced to $$C = \int_0^T M^2 \cdot e^{j\frac{\pi}{4}} \cdot e^{j(\Delta\omega t)} \cdot dt \qquad (6)$$

Figure 4:
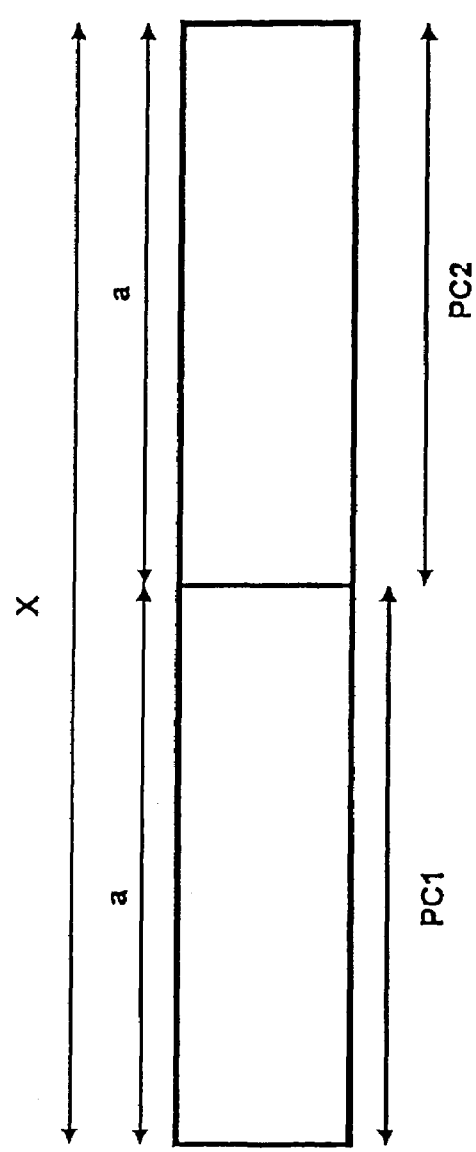
FIG. 4 illustrates a series of partial correlation periods within a single slot.

To evaluate the phase due to the carrier offset, the above integral may be evaluated over a number of intervals (i.e. by using partial correlations). The differential phase of the results will then contain a component which is directly proportional to the carrier frequency offset. This process is shown in the following equations where 2 intervals are used. An illustration of the use of two non-overlapping partial correlations is given also at FIG. 4.

$$C_1 = \int_0^{\frac{T}{2}} M^2 \cdot e^{j\frac{\pi}{4}} \cdot e^{j(\Delta\omega t)} \cdot dt$$

$$C_2 = \int_{\frac{T}{2}}^{T} M^2 \cdot e^{j\frac{\pi}{4}} \cdot e^{j(\Delta\omega t)} \cdot dt$$

The differential phase between the results is given by:

$$\Delta\Phi = \angle C_2 - \angle C_1 = \frac{(\Delta\omega)T}{2} \qquad (7)$$

The carrier frequency offset may then be computed from:

$$\Delta\omega = \frac{2\Delta\Phi}{T} \qquad (8)$$

By making use of N partial correlations, N−1 differential phase values may be obtained each indicating a carrier frequency offset of:

$$\Delta\omega = \frac{(\Delta\Phi)N}{T} \quad (9)$$

where $\Delta\Phi$ is $$\Delta\Phi = \angle C_i - \angle C_{i-1} \quad (10)$$

with $C_i$ representing the $i^{th}$ partial correlation.

Multiple values of differential phase can be used to estimate the carrier frequency offset under additive white Gaussian noise (AWGN), multi-path and multi-user conditions by applying averaging to the individual results obtained from equation 10:

$$\overline{\Delta\omega} = \frac{\sum_{i=1}^{N-1} \Delta\omega_i}{N-1} \quad (11)$$

The effect of Doppler is minimized by ensuring that the differential phase values are obtained using partial correlation over periods which are much less than the coherence time of the channel. The coherence time is a period within which there is a high degree of correlation between faded signal samples and is approximately equal to the inverse of the Doppler frequency.

For a mobile speed of 500 km/h and a nominal carrier frequency of 2 GHz, the Doppler frequency approximates to 925 Hz. The corresponding value of coherence time is around $1 \times 10^{-3}$ seconds. Evaluation of differential phase values as described above is accomplished within the duration of a single PCCPCH+SCH symbol period (i.e. ~67× $10^{-6}$ seconds), which is much less than the coherence time.

Phase variations due to Doppler usually may be assumed to be small and therefore would not significantly affect the computations described above. Improved estimates of the carrier frequency offset may be obtained, however, by computation of a set of values for the frequency offset over a number of slots. An averaging process can then be applied.

An averaging process is shown by the equation $$\overline{\Delta\omega} = \frac{\sum_{k=1}^{M}\sum_{i=1}^{N-1} \Delta\omega_{ik}}{M(N-1)}$$

where $\Delta\omega_{ik}$ represents the frequency offset estimate of the $i^{th}$ correlation of the $k^{th}$ slot. M is the number of slots used in the averaging process. The frequency offset is then derived from the average value taken from the series of partial correlations within each slot and over a number of slots.

Various factors affect the choice of the number of partial correlations per primary synchronization code to be used in the above process. An increase in the number of partial correlations in the series of correlations results in a shorter correlation period (relative to the coherence time). With shorter correlation periods smaller variations of phase due to Doppler may be expected. Use of shorter correlation periods, however, causes a drop in the detected signal power and leads to a reduced signal to noise plus interference ratio. For reduced signal to noise ratios the effect of AWGN and interference on the detected differential phase values becomes more severe. It has been found that two partial correlations per primary synchronization code are sufficient for estimates of the carrier frequency offset to be obtained.

The minimum detectable frequency offset is dependent upon the ratio of the powers of the signal to the noise plus interference and also on the variations in the signal phase due to Doppler over the partial correlation intervals. Experimental results indicate that for a mobile station moving at 80 kilometres per hour (km/h) the method described herein can be expected to detect more than 95% of the carrier frequency offsets and the detection rate remains above 75% for 500 Km/h.

Figure 5:
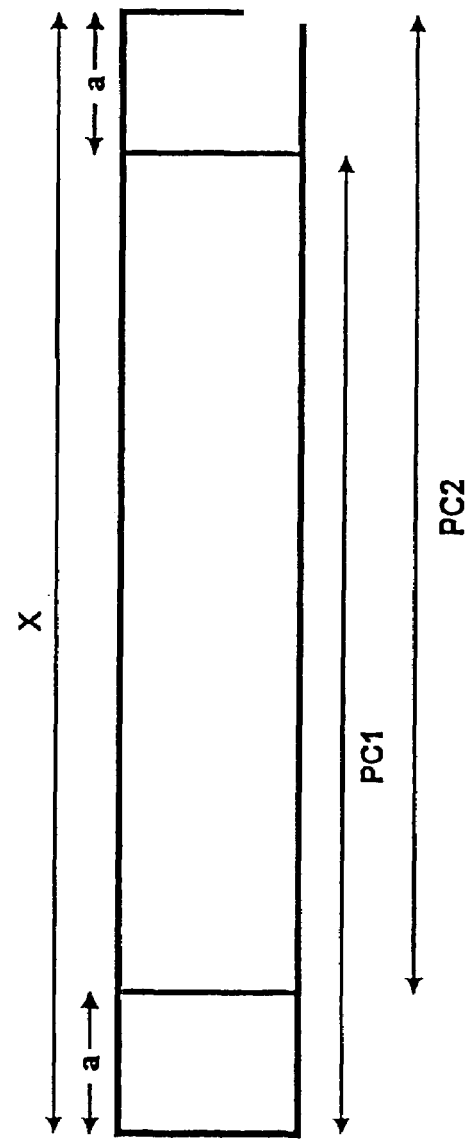
FIG. 5 illustrates a series of overlapping partial correlation periods within a single slot.

For increased correlation powers overlapping between the partial correlations may be employed. By this means each of the correlations in a series of correlations include a part of the synchronization code common to another of the correlations in the series of correlations. With reference to FIG. 5 two overlapping partial correlations are illustrated as performed within a single slot. In UMTS the primary synchronization code X is of length 256 chips. A first partial correlation PC1 is performed with the first (256-a) chips and a second partial correlation PC2 is performed with the last (256-a) chips. In this series of correlations 256-2a chips are common to both PC1 and PC2. More generally first and second overlapping partial correlations may be represented as $$PC_1 = \int_0^{\frac{(X-a)T}{X}} M^2 \cdot e^{j\frac{\pi}{4}} \cdot e^{j(\Delta\omega t)} \cdot dt$$

$$PC_2 = \int_{\frac{a \cdot T}{X}}^{T} M^2 \cdot e^{j\frac{\pi}{4}} \cdot e^{j(\Delta\omega t)} \cdot dt$$

Owing to the increase in the length of each partial correlation period the arrangement shown in FIG. 5 provides a correlation power greater than that obtained from the non-overlapping arrangements. The corresponding differential phase is given by $(\Delta\omega.a.T)/X$, where X is the total number of chips in the primary synchronization code, T is the duration of tie primary synchronization code in seconds and a is the number of chips of the primary synchronization code not used in the partial correlation process.

Figure 3:
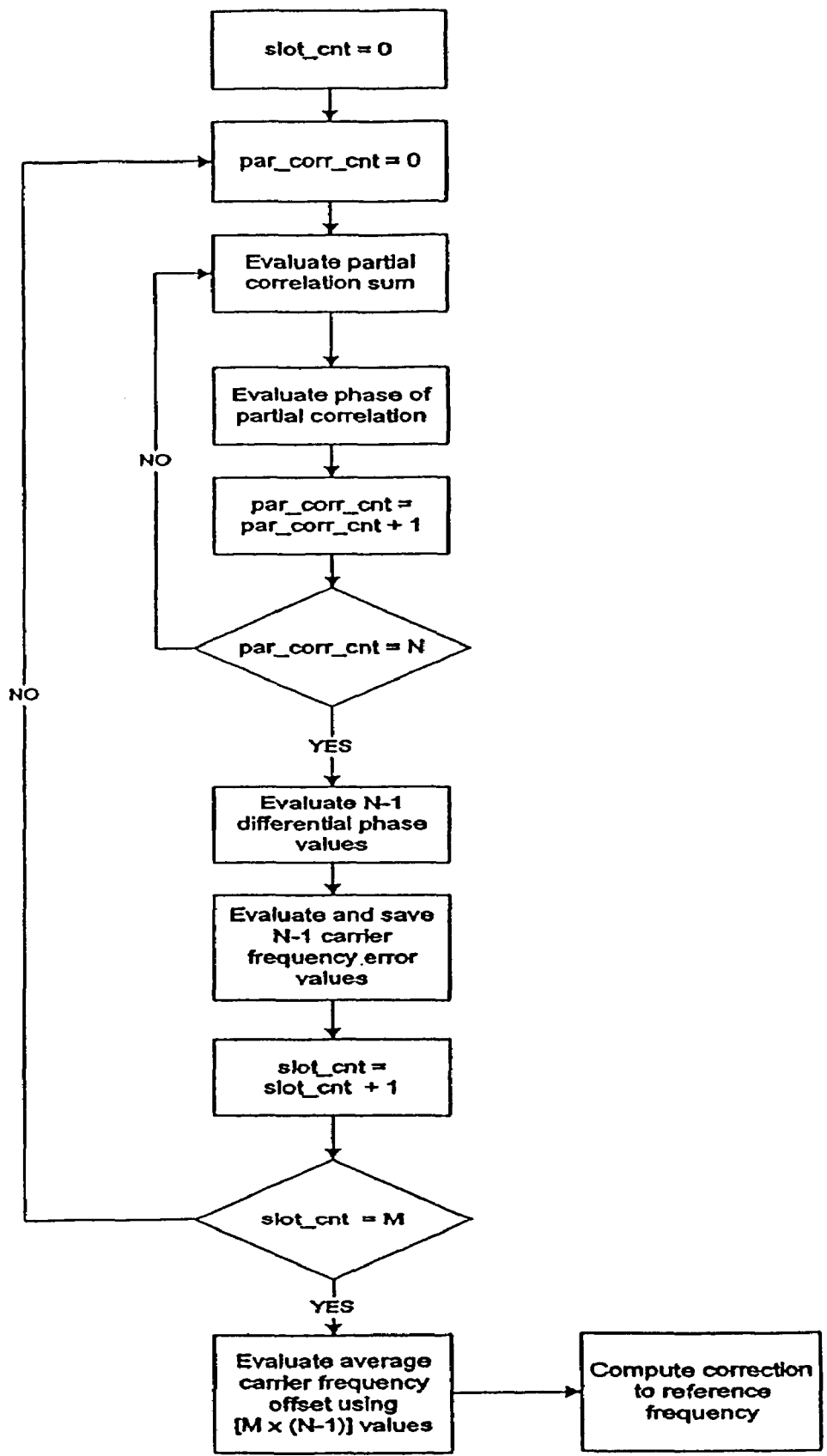
FIG. 3 is a flow chart illustrating the method of carrier offset estimation.

For a carrier frequency offset of 1 ppm, a carrier frequency of 2 GHz, and with a=64 chips as shown in this example, the nominal correlation peak of the partial correlations will be approximately 2.5 dB less than that provided by a correlation with the complete 256 chip code. The nominal differential phase resulting from use of an overlap with a=64 chips is 12 degrees and this difference is sufficiently large to be detected by the algorithm of FIG. 3.

The advantage conferred by the use of overlapping partial correlations may be demonstrated by comparison of the above example (a=64 chips) with an arrangement where there is no overlapping of the partial correlations. Where a=128 chips and two partial correlations are performed in a single slot the partial correlation peak will be 6 dB less than for the case of a full correlation (a=0). When a relatively high level of noise plus interference is encountered, overlapping partial correlations can be used to increase the power in a partial correlation peak thereby to avoid an unacceptable degradation in performance.

In general, a suitable value for a will be such that the overlapping correlation power is maximised while the resulting differential phase remains within the range of detection of the system. The invention may be carried into effect by means of standard digital techniques well known in the art.

The invention claimed is:

1. A method of estimating the frequency offset in a direct sequence spread spectrum communications receiver comprising computation of differences in phase imparted by down-conversion in the receiver to parts of a synchronization code received over a radio channel, said differences in phase being computed from a series of correlations of parts of the received synchronization code with a synchronization code stored in the receiver, in which the period over which the series of correlations is performed is not greater than the length of said stored synchronization code.

wherein the value of the output phase computed from a first series of correlations is summed with the values of the output phases computed from a number of succeeding series of correlations and the average value of the summation is used as the estimate of frequency offset.

2. A method of estimating the frequency offset in direct sequence spread spectrum communications receiver comprising computation of differences in phase imparted by down-conversion in the receiver to parts of a synchronization code received over a radio channel, said differences in phase being computed from a series of correlations of parts of the received synchronization code with a synchronization code stored in the receiver, in which the period over which the series of correlations is not greater than the length of said stored synchronization code, wherein the series of partial correlations is performed on a code of length X chips and comprises a first correlation period of the first X-a chips of the code and a second correlation period of the last X-a chips of the code where a is a number of chips of said code not greater than X/2.

3. A method of estimating the frequency offset in a direct sequence spread spectrum communications receiver comprising computation of differences in phase imparted by down-conversion in the receiver to parts of a synchronization code received over a radio channel, said differences in phase being computed from a series of correlations of parts of the received synchronization code with a synchronization code stored in the receiver, in which the period over which the series of correlations is performed is not greater than the length of said stored synchronization code, wherein each of the correlations in the series of correlations include a part of the received synchronization code common to another of the correlations in the series of correlations, and wherein the value of the output phase computed in the series of correlations is summed with values of the output phases computed from a number of succeeding series of correlations and the average value of the summation is used as the estimate of frequency offset.

* * * * *